US010417937B2

(12) United States Patent
Gaillot et al.

(10) Patent No.: US 10,417,937 B2
(45) Date of Patent: Sep. 17, 2019

(54) TRAINING DEVICE FOR MEDICINE INJECTION DEVICES AND RESET DEVICE FOR RESETTING SUCH A TRAINING DEVICE

(71) Applicant: F. Hoffmann-La Roche AG, Basel (CH)

(72) Inventors: Maxime Gaillot, Zaessingue (FR); Mark Anthony Chipperfield, Aesch (CH); Mark Teucher, Landsdown Bath (GB); Paul Hayton, Bristol (GB)

(73) Assignee: F. Hoffmann-La Roche AG, Basel (CH)

( * ) Notice: Subject to any disclaimer, the term of this patent is extended or adjusted under 35 U.S.C. 154(b) by 810 days.

(21) Appl. No.: 14/778,531

(22) PCT Filed: Mar. 27, 2014

(86) PCT No.: PCT/EP2014/056137
§ 371 (c)(1),
(2) Date: Sep. 18, 2015

(87) PCT Pub. No.: WO2014/154795
PCT Pub. Date: Oct. 2, 2014

(65) Prior Publication Data
US 2016/0293058 A1 Oct. 6, 2016

(30) Foreign Application Priority Data
Mar. 28, 2013 (EP) .................................... 13161552

(51) Int. Cl.
*G09B 23/28* (2006.01)
(52) U.S. Cl.
CPC ................. *G09B 23/285* (2013.01)

(58) Field of Classification Search
CPC .................................................. G09B 23/285
(Continued)

(56) References Cited

U.S. PATENT DOCUMENTS

| 836,760 A | 11/1906 | Hadfield |
|---|---|---|
| 3,237,340 A | 3/1966 | Knott |

(Continued)

FOREIGN PATENT DOCUMENTS

| AU | 2009200841 A1 | 3/2009 |
|---|---|---|
| CA | 2594627 C | 4/2012 |

(Continued)

OTHER PUBLICATIONS

"Stunt Kit: Retractable Needle," The Specialists LTD, https://www.youtube.com/watch?v=htxmJFg-dik&feature=youtu.be, Nov. 16, 2009 ("Specialists").*

(Continued)

*Primary Examiner* — Samchuan C Yao
*Assistant Examiner* — Jennifer L Korb
(74) *Attorney, Agent, or Firm* — Mintz Levin Cohn Ferris Glovsky and Popeo, P.C.

(57) ABSTRACT

The training device for medicine injection devices comprises a plunger slidably arranged in the cavity of a body. The plunger comprises a compressible element arranged at a distal end of the plunger and adapted to provide a resistance between compressible element and inner wall if the cavity of the body when the plunger is moved in the cavity towards the distal end of the body. The resistance corresponds to an injection resistance of a medicine injected into a patient. The invention also comprises a reset device for resetting the training device from a used status to a condition for reuse.

16 Claims, 6 Drawing Sheets

(58) Field of Classification Search
USPC .......................................................... 434/262
See application file for complete search history.

(56) References Cited

U.S. PATENT DOCUMENTS

| | | | |
|---|---|---|---|
| 3,426,448 A | 2/1969 | Sarnoff | |
| 3,795,061 A | 3/1974 | Sarnoff et al. | |
| 4,445,510 A | 5/1984 | Rigby | |
| 4,640,686 A | 2/1987 | Dalling et al. | |
| 5,567,160 A | 10/1996 | Massino | |
| 6,030,366 A | 2/2000 | Mitchell | |
| 6,159,184 A | 12/2000 | Perez et al. | |
| 6,171,283 B1 | 1/2001 | Perez et al. | |
| 6,344,032 B1 | 2/2002 | Perez et al. | |
| 6,613,022 B1 | 9/2003 | Doyle | |
| 6,623,459 B1 | 9/2003 | Doyle | |
| 6,972,006 B2* | 12/2005 | Ferguson | A61M 5/3129 604/186 |
| 7,416,540 B2 | 8/2008 | Edwards et al. | |
| 7,648,482 B2 | 1/2010 | Edwards et al. | |
| 7,648,483 B2 | 1/2010 | Edwards et al. | |
| 7,682,155 B2 | 3/2010 | Raven et al. | |
| 7,731,686 B2 | 6/2010 | Edwards et al. | |
| 7,731,690 B2 | 6/2010 | Edwards et al. | |
| 7,749,194 B2 | 7/2010 | Edwards et al. | |
| 7,918,823 B2 | 4/2011 | Edwards et al. | |
| 7,947,017 B2 | 5/2011 | Edwards et al. | |
| 8,016,788 B2 | 9/2011 | Edwards et al. | |
| 8,021,344 B2 | 9/2011 | Edwards et al. | |
| 8,172,082 B2 | 5/2012 | Edwards et al. | |
| 8,206,360 B2 | 6/2012 | Edwards et al. | |
| 8,226,610 B2 | 7/2012 | Edwards et al. | |
| 8,231,573 B2 | 7/2012 | Edwards et al. | |
| 8,313,466 B2 | 11/2012 | Edwards et al. | |
| 2004/0161732 A1 | 8/2004 | Stump et al. | |
| 2005/0020979 A1 | 1/2005 | Westbye et al. | |
| 2005/0182370 A1* | 8/2005 | Hato | A61M 5/31501 604/213 |
| 2006/0084050 A1 | 4/2006 | Haluck | |
| 2007/0021718 A1* | 1/2007 | Burren | A61M 5/24 604/110 |
| 2007/0111175 A1 | 5/2007 | Raven et al. | |
| 2008/0059133 A1 | 3/2008 | Edwards et al. | |
| 2010/0160894 A1 | 6/2010 | Julian et al. | |
| 2011/0003488 A1 | 1/2011 | Tamura | |
| 2012/0015336 A1* | 1/2012 | Mach | G09B 23/285 434/262 |
| 2012/0107783 A1 | 5/2012 | Julian et al. | |
| 2012/0253314 A1 | 10/2012 | Harish et al. | |
| 2012/0301858 A1 | 11/2012 | Park et al. | |
| 2016/0049098 A1* | 2/2016 | Swanson | G09B 23/285 434/262 |

FOREIGN PATENT DOCUMENTS

| | | | |
|---|---|---|---|
| CN | 101484199 | | 7/2009 |
| EP | 0423864 | A1 | 4/1991 |
| EP | 0825883 | A1 | 3/1998 |
| EP | 0864335 | A2 | 9/1998 |
| EP | 1284769 | A2 | 2/2003 |
| EP | 1946286 | A2 | 7/2008 |
| EP | 2043711 | A2 | 4/2009 |
| EP | 2058020 | A2 | 5/2009 |
| EP | 2237822 | A2 | 10/2010 |
| GB | 836760 | A | 6/1960 |
| GB | 2449027 | A | 11/2008 |
| GB | 2451769 | A | 2/2009 |
| GB | 2456245 | A | 7/2009 |
| GB | 2458586 | A | 9/2009 |
| GB | 2463071 | A | 3/2010 |
| GB | 2471981 | A | 1/2011 |
| GB | 2477227 | A | 7/2011 |
| GB | 2478085 | A | 8/2011 |
| GB | 2480407 | A | 11/2011 |
| WO | WO-92/18187 | A1 | 10/1992 |
| WO | WO-01/85239 | A2 | 11/2001 |
| WO | WO-2005/009519 | A1 | 2/2005 |
| WO | WO 2005009519 | A1 * | 2/2005 ............ A61M 5/326 |
| WO | WO-2006/016891 | A2 | 2/2006 |
| WO | WO-2006/057636 | A1 | 6/2006 |
| WO | WO-2006/083876 | A2 | 8/2006 |
| WO | WO-2007/056231 | A2 | 5/2007 |
| WO | WO-2007/126851 | A2 | 11/2007 |
| WO | WO-2008/005315 | A2 | 1/2008 |
| WO | WO-2008/0005315 | A2 | 1/2008 |
| WO | WO-2008/029644 | A1 | 3/2008 |
| WO | WO-2008/064092 | A2 | 5/2008 |
| WO | WO-2008/091838 | A2 | 7/2008 |
| WO | WO-2009/095805 | A2 | 8/2009 |
| WO | WO-2009/140251 | A2 | 11/2009 |
| WO | WO-2011/096673 | A2 | 8/2011 |
| WO | WO-2012/056712 | A1 | 5/2012 |

OTHER PUBLICATIONS

English Abstract of CN 101484199 dated Jul. 15, 2009 (88 pgs.).
International Search Report and Written Opinion Issued in PCT/EP2014/056137 dated May 27, 2014.

* cited by examiner

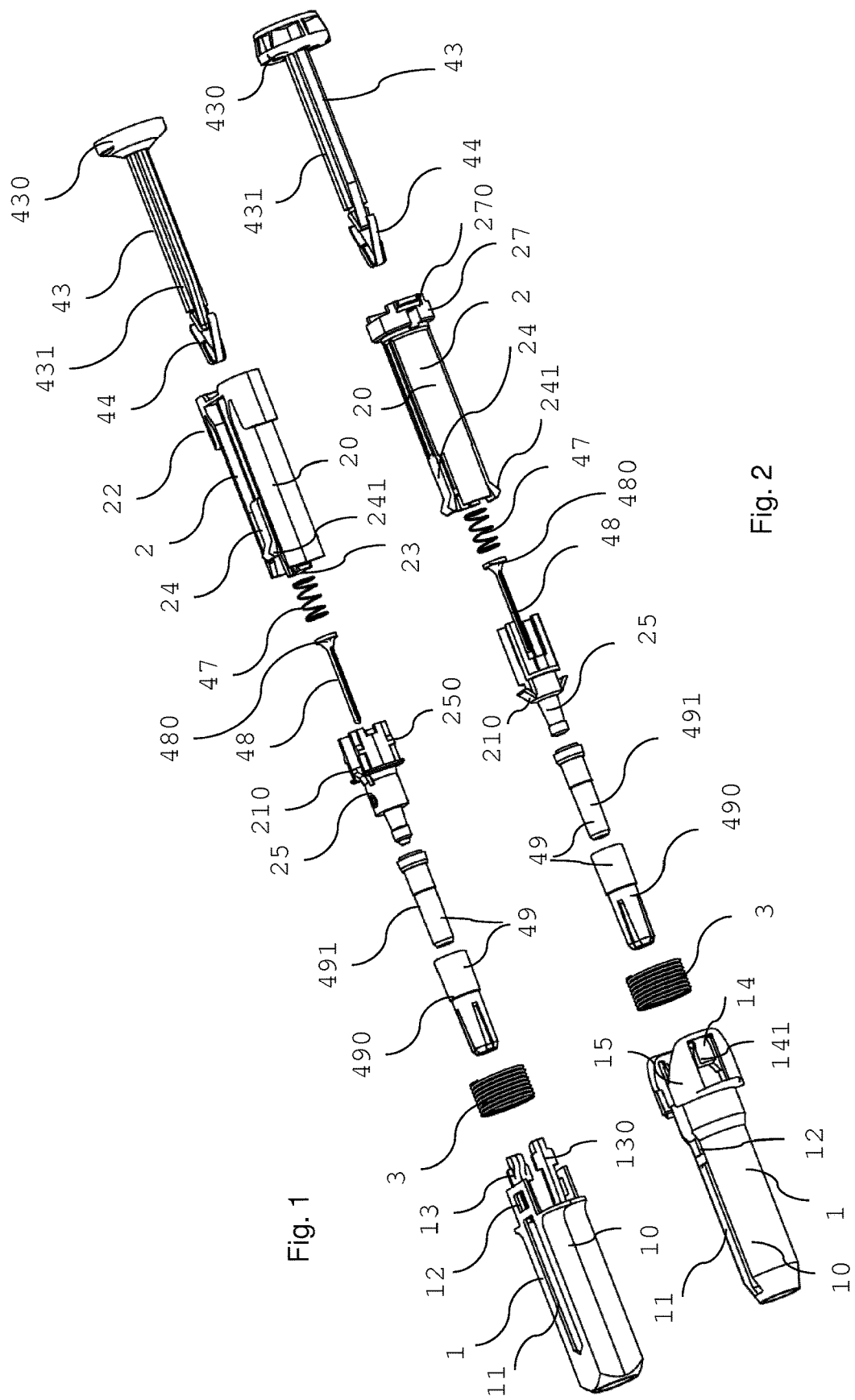

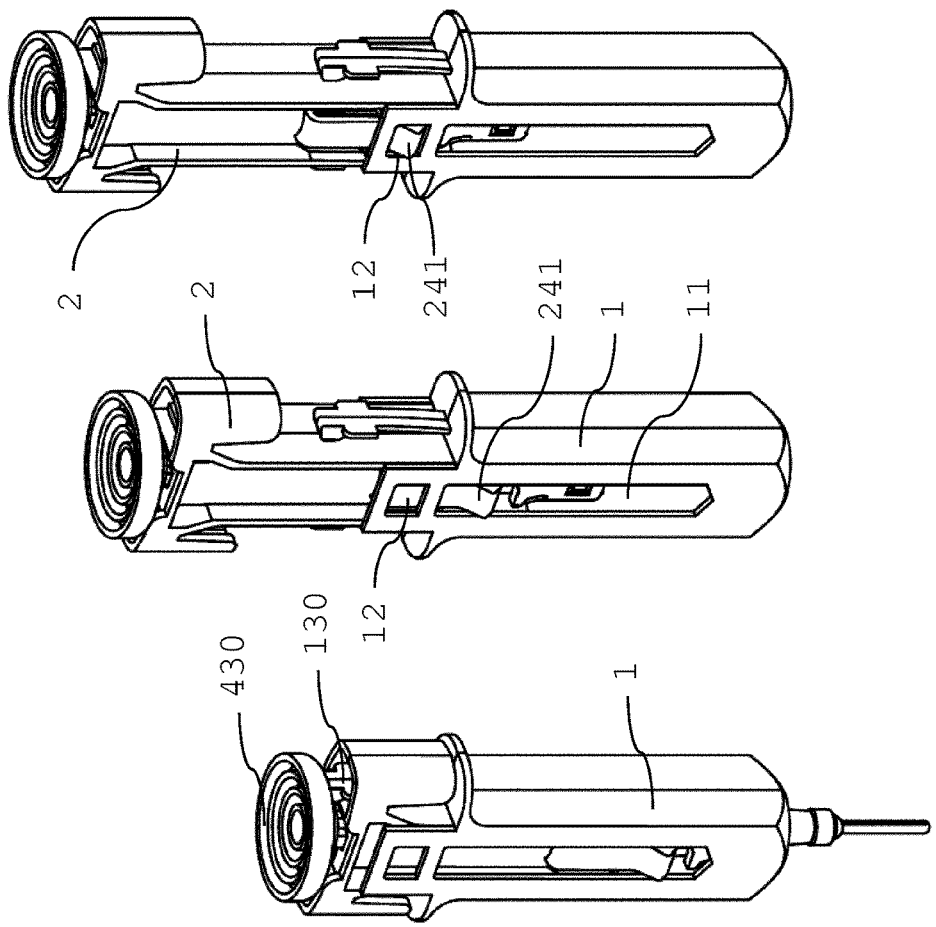
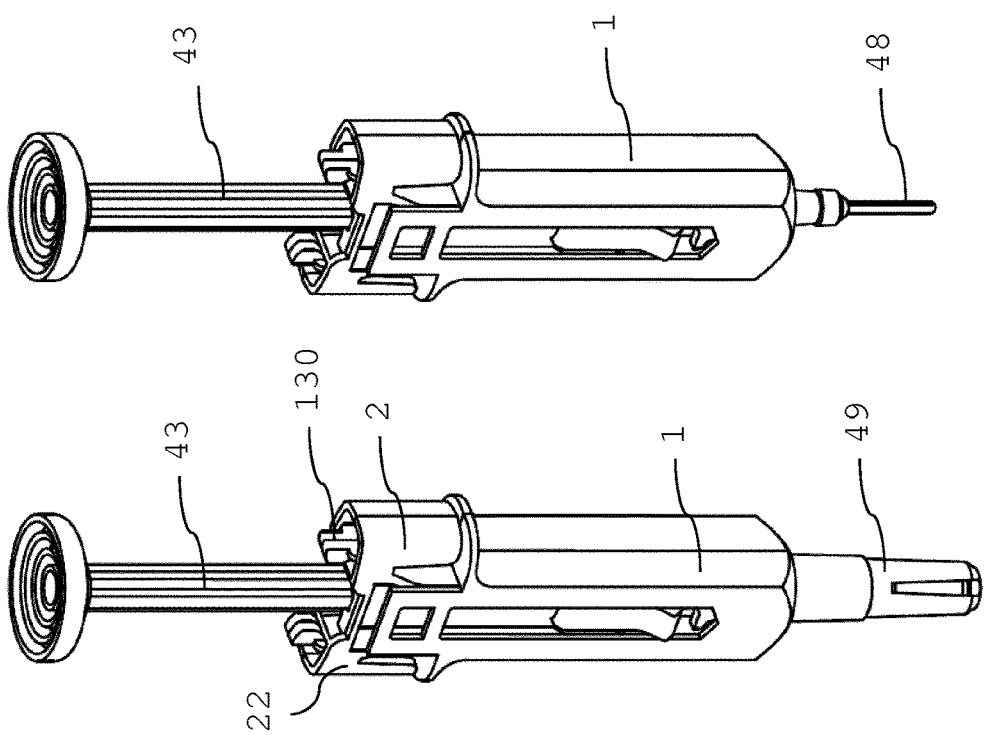

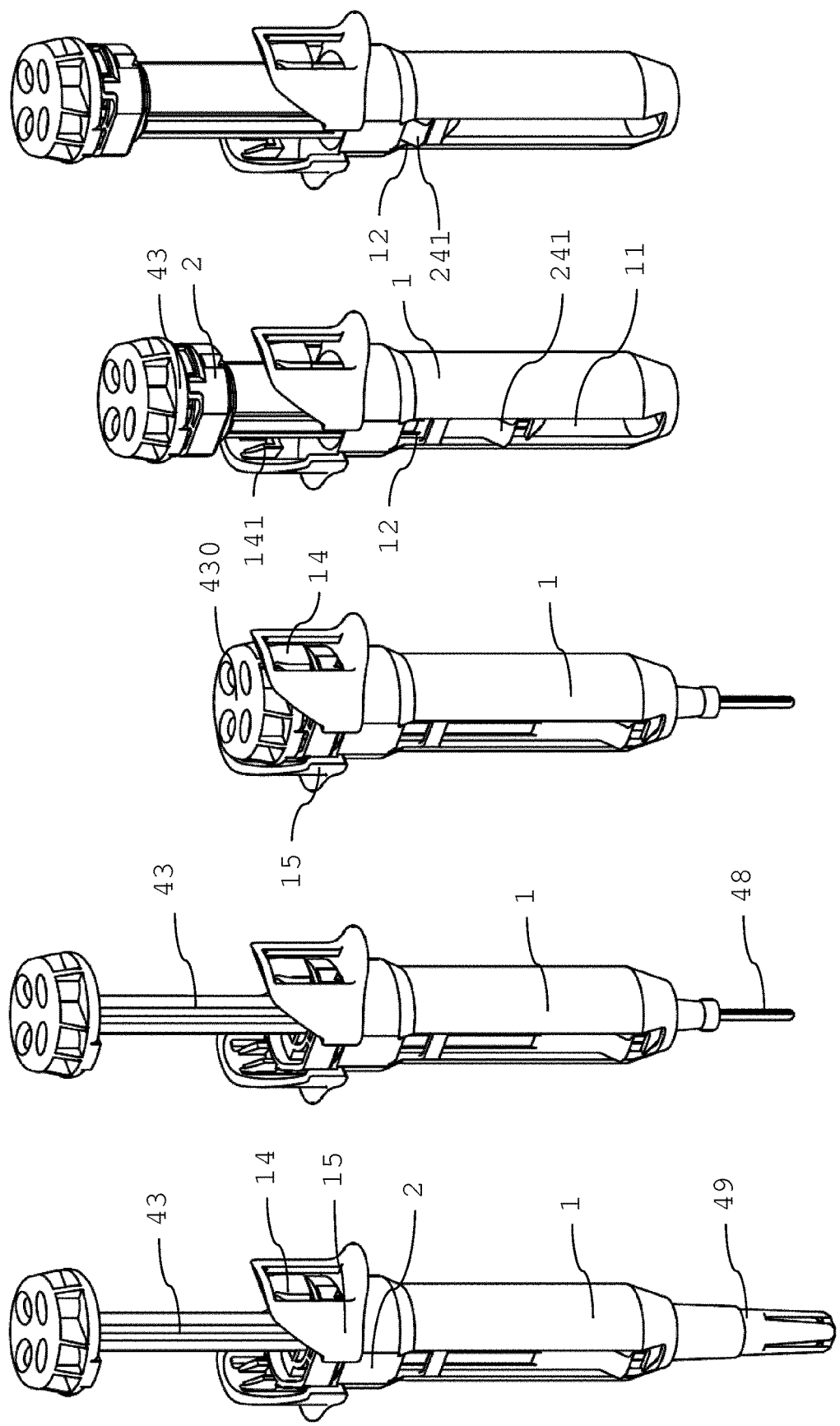

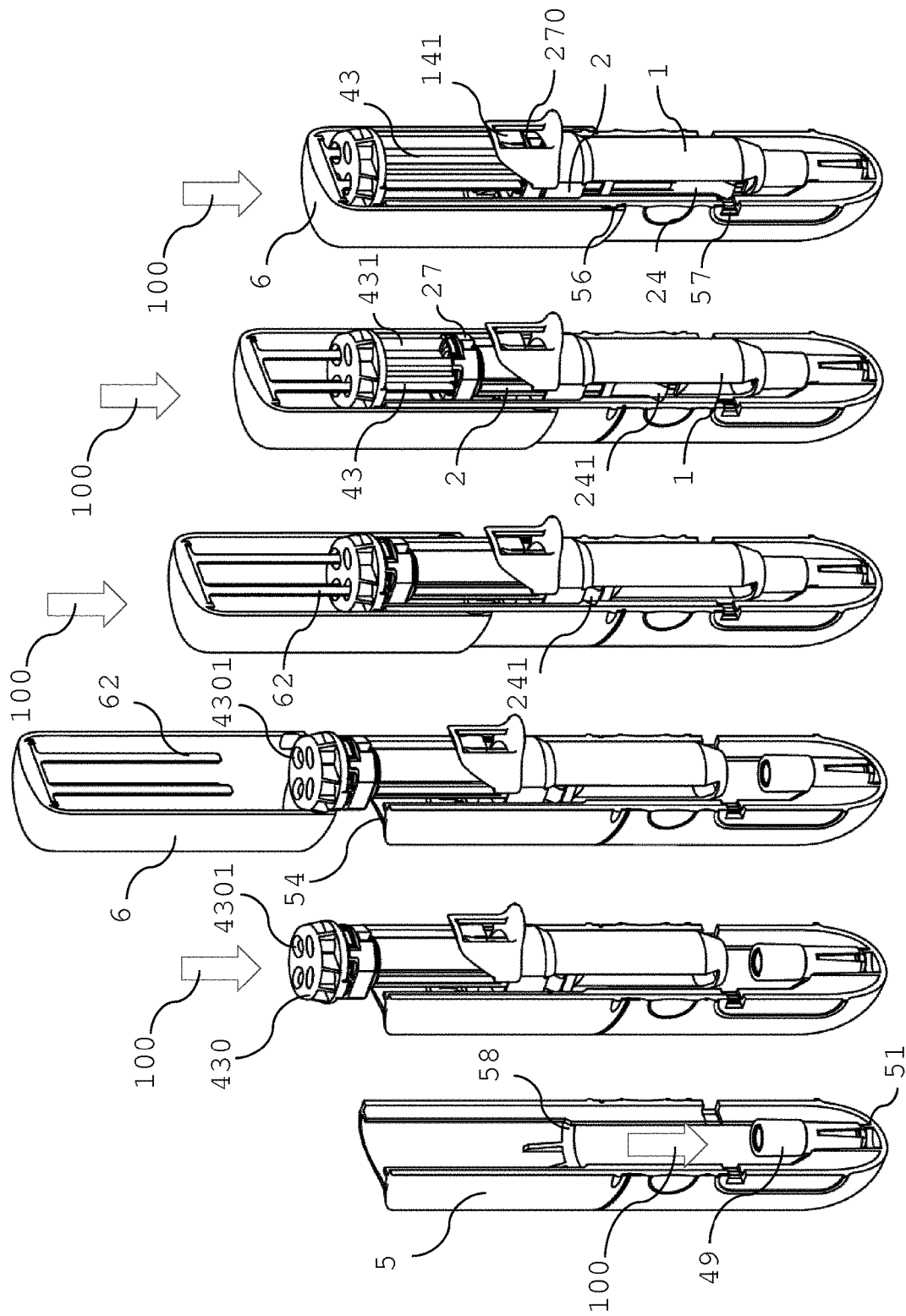

TRAINING DEVICE FOR MEDICINE INJECTION DEVICES AND RESET DEVICE FOR RESETTING SUCH A TRAINING DEVICE

CROSS-REFERENCE TO RELATED APPLICATIONS

This application is a national stage application, filed under 35 U.S.C. § 371, of International Application No. PCT/EP2014/056137 filed on Mar. 27, 2014, which claims priority to European Patent Application No. 13161552.8 filed on Mar. 28, 2013, the contents of each of which are hereby fully incorporated by reference.

FIELD

The invention relates to the field of medicine injection training devices and reset devices for such training devices.

BACKGROUND

Correct injection of medicine via an injection device such as a syringe has to be trained in order to properly administer the medicine. For example, self-injection has to be trained and also tested to its feasibility, for example for patients having manually limited motor skills, such as patients with rheumatism, arthritis, gout or like handicaps.

SUMMARY

In a first aspect of the present invention, there is provided a training device for medicine injection devices. The training device comprises a body having a proximal end and a distal end and a cavity formed in the body. The training device comprises a shield having a proximal end and a distal end. The shield is slidably attached to the body, slidable between a retracted position exposing a pin arranged at the distal end of the body and directing therefrom, and an extended position covering the pin. A spring is coupled to body and shield. The spring biases the shield such as to enable the shield to advance toward the extended position. The training device further comprises releasable cooperating first locking members on the body and the shield for engaging each another to hold the shield in the retracted position and releasable cooperating second locking members on the body and the shield for engaging each another to hold the shield in the extended position. The training device yet further comprises a plunger slidably arranged in the cavity of the body. The plunger comprises a compressible element, which is preferably arranged at a distal end of the plunger. The compressible element is adapted to exert a force onto the plunger when the plunger is moved in the cavity towards the distal end of the body. The force corresponds to an injection resistance of a medicine injected into a patient. Thereby, the injection resistance that arises when a medicine is administered, that is, when medicine is pushed through a needle and into a patient, is simulated.

The simulated injection resistance in the training device is adapted to be preferably identical or at least very similar to an injection resistance of a real injection device for a specific medicine administration in order to simulate a real injection resistance as closely as possible.

In a real device, an injection resistance arises from the medicine to be pressed through the needle and into the tissue of a patient.

The compressible element of the training device according to the invention is designed and adapted to simulate the real injection resistance (that is, in interplay with the cavity). Thus, when moving the plunger in the cavity of the device, the resistance of the plunger is always higher than a resistance of a plunger in a real injection device with a corresponding injection resistance.

A real injection device may contain a plunger with a stopper at the distal end of the plunger. The stopper may consist of a material having a certain flexibility. However, the stopper has the function to seal off the medicine chamber, but provides no or only a minimum resistance. Any additional resistance of a stopper would be negative due to the resistance rendering more difficult the medicine injection procedure.

The force exerted onto a plunger of the training device may correspond to a resistance, for example caused by friction, between compressible element and inner wall of the cavity of the body. The force may also be an axially directed force, for example generated by an axially compressible element. By way of example only such an axially compressible element may be one or several springs integrated in the plunger or in the cavity or a reversibly compressible material arranged in the cavity or forming part of the plunger. Preferably, the compressible element forms an integral part of the plunger. However, the compressible element may also be a separate part attached to or connected with the plunger, such as for example mechanical springs directly acting on the plunger. By simulating an injection resistance with compressible means that are for example compressed or expanded in or guided along a cavity in a corresponding body, the movement of a plunger as well as the time a plunger needs for a medicine to be completely or as required administered may be simulated. A force exerted onto the plunger may be affected by the design or physical properties or both of the compressible element. Accordingly, a change of a force may be achieved by changing these parameters in order to simulate different injection resistances. The compressible element is compressed or extended to some extent in the cavity and therefore exerts a certain force onto the plunger when the plunger is moved along the cavity. Especially, if the force corresponds to a resistance between the compressible element of the plunger and the cavity, that is, and the wall defining the radial extension of the cavity, this resistance may be chosen and adapted by appropriate selection of materials. Preferably, a compressible element may be varied without adapting other features of the training device. For example, flexibility, elasticity or bending stiffness of the material for the compressible element may be chosen according to a required force or resistance. Also, friction between compressible element and cavity wall may be defined and altered by the material and surface properties of the compressible element and the cavity wall. By being able to simulate different injection resistances, the training device may be used to simulate the use of medicines having different viscosity. By this, a user may be trained on the injection of a medicine or its application at a specific injection location. A simulation of different injection resistances is favorable in testing if a user would be able to handle an injection device. For example a user might be able to perform self-application of a medicine with low viscosity (high fluidity) but not of a medicine with high viscosity.

By the provision of a pin and a shield covering or letting the pin extend from the distal end of the shield, a needle guard system of an actual injection device is simulated. Preferably, in the training device, a pin has a rounded distal tip and is made of a plastic material. Although no risk of getting harmed by the exposed pin exists in the training device, the simulation of the mechanism of an injection device such as the exposing and covering of a needle may be performed in a realistic manner. Accordingly, releasable locking members are provided in the training device that allow for a locking and releasing of body and shield of the training device in the retracted or extended position. However, locking of a shield in an extended position covering the used needle of an injection device is not releasable, at least not in disposable injection devices. Since the training device according to the invention shall be able to be reset to a condition for repeatable use, locking members are constructed as releasable locking members, which may be reset for example with a reset device according to the invention and as will be described further below.

With the training device according to the invention shape, especially the external form, application steps and device behavior (actuation force, injection resistance), preferably including mechanical and ergonomic principles, of a real injection device may be simulated. The training device according to the invention may even be adapted to simulate the looks and application behavior of a specific injection device related to the administration of a specific medicine preferably also at a specific injection location. In addition, through provision of releasable locking members, the training device is re-usable, that is, it has the ability to be reset after use and be put into condition of repeated use. Accordingly, such a training device is especially suited for—but not limited to—people which are limited in their manual motor skills such as arthritis or rheumatic patients and which have to train the operation of an injection device, especially also test if such an operation may be performed by them for self-administration of medicine, for example medicine against such diseases as for example arthritis or rheumatism. However, the training device is generally suited to train the administration of medicine for any kind of users such as for example patients, persons looking after a patient and health care persons.

According to an aspect of the training device according to the invention, the compressible element comprises plate springs mounted to the distal end of the plunger. Therein the plate springs extend along a portion of the plunger and radially outwardly from the plunger. Plate springs are simple to be manufactured and cost efficient. Also a resistance between plate springs and inner wall of the cavity may easily be adapted. For example by changing the material of the plate springs, the resistance between the wall and the plate spring may be adapted. For example, material with low flexibility may be chosen for a high resistance and material with a high flexibility may be chosen for a low resistance. Also by appropriate selection of the material for plate springs or the material of a plate springs' surface, respectively, friction (and therefore the resistance) between a plate spring portion being in contact with the inner wall of the cavity may be influenced. It goes without saying that friction or a resistance may also be adapted through appropriate selection of the material of the body or of an inner surface of the cavity. By way of example only, the plate springs or the cavity may be covered, coated or over-molded, for example by an elastomeric or plastic material such as rubber.

According to another aspect of the training device according to the invention, the compressible element exerts a force onto the plunger, which force acts in a substantially longitudinal axial direction of the plunger. Such force acting in a substantially longitudinal direction is preferably realized by spring means. Spring means may for example be one or several mechanical springs or reversibly compressible material such as for example a foam of plastics material acting axially on the plunger. Spring means may for example be arranged in the cavity between the distal end of the cavity and the distal end of the plunger. When the plunger is pushed into the cavity, the spring means are compressed and exert a force onto the plunger simulating the injection resistance. Spring means, especially in the form of mechanical springs may also be arranged outside of the cavity, for example between plunger head and proximal end of body such that the spring is compressed when the plunger is pushed into the cavity.

In a specific embodiment, the compressible material is gaseous, for example air, and the compressible element is formed by the cavity containing gas. The distal end of the plunger then forms a gas-tight connection with the inner side wall of the cavity. The cavity or preferably the gas-tight connection is provided with a leak of a defined size. By pushing the plunger into the cavity, the gas in the cavity is compressed and forced through the defined leak out of the cavity. Through retraction of the plunger out of the cavity, the cavity may be filled with gas again through the leak.

A compressible element in the form of spring means may also be arranged such as to be extended when the plunger is pushed into the cavity. For example, a mechanical spring may be attached to the distal end of the plunger and the proximal end of the cavity or the body, respectively.

By appropriate selection of the material, design and arrangement of spring means, an essentially continuous force needed to compress or extend the spring means may be generated to simulate a continuous injection resistance.

Preferably, spring means form an integral part or are integrated into the plunger. For example a plunger may be made of or comprise a compressible material, for example a distal end portion may be made of such a compressible material. For example, also the form of the cavity may be varied, for example the cavity may form a tapered cylinder with a narrowing diameter versus the distal end of the cavity such that a compressible element of a plunger is the more compressed the more the plunger is inserted into the cavity.

Compressible elements providing friction between the plunger and the wall of the cavity may also be combined with spring means, especially with mechanical springs. For example, the distal end portion of the plunger may be provided with radially extending portions being in contact with the wall of the cavity. These radially extending portions may for example be spring biased plugs of solid material or for example also spring biased wheels rubbing or rolling, respectively, along the cavity walls when the plunger is moved along the cavity.

Preferably a compressible element is completely arranged inside the cavity such as to be invisible to a user of the training device.

According to another aspect of the training device according to the invention, the body is provided with an abutment portion at its proximal end. The abutment portion is adapted to cooperate with an end stop provided at the plunger, such as to prevent the plunger from being entirely removed from the cavity when the plunger is moved in a proximal direction. In a training device that shall be reset several times for repeated use of the training device, a plunger has to be retracted from the cavity. By providing an abutment portion in a body the plunger is moved in and by providing a corresponding end stop at the plunger it may be achieved that a plunger does not fall out of the proximal end of the cavity when end stop and abutment portion engage each other. Such a retention mechanism for the plunger facilitates the handling of the training device since no plunger has to be reinserted into the cavity of the body for being able to reuse the training device. In addition, a retention mechanism also defines a precise reset position of the plunger in the cavity for a high repeatability. Preferably, abutment portion and end stop are formed integrally with the body and piston or part thereof.

In some embodiments, the abutment portion is a recess in an inner wall of the body and the end stop is a proximal end of the compressible element. Therein, the proximal end may extend into the recess due to the elastic property of the compressible element. For example, the end stop may be a proximal end of a plate spring. Such an embodiment of the retention mechanism may be achieved by simple constructional means and may be integrated into the compressible element.

According to a further aspect of the training device according to the invention, the pin is slidably arranged in a pin mounting element, preferably attached to the body of the training device. The pin mounting element comprises a pin biasing member adapted to be tensioned when the pin is moved in a proximal direction. By this, an injection resistance of a needle injected into the skin of a patient may be simulated. Also the sensation of an injection on the skin may be given, however without skin damage or pain. The pin is neither intended nor suitable to penetrate a patient's skin. In addition to the simulation of the initial resistance that a needle may have when penetrating skin, also the sight of a 'disappearing' needle is simulated (with a real device the needle penetrates into the patient, in the training device the pin retracts into the shield due to compression of the biasing member).

According to another aspect of the training device according to the invention, the first locking members comprise a release latch arranged at the proximal end of the shield. The release latch is deflectable outwardly for disengaging the first locking members, thereby allowing the shield to advance to the extended position. An outward deflection is preferably initiated by the movement of the plunger in a distal direction. Preferably, the disengaging action is performed when the end of the injection simulation is reached (corresponding to the completed administration of medicine). Preferably, this is the case when the plunger has reached an end position. In this end position, preferably, a plunger head for pushing the plunger along the cavity and into the body, presses against the release latch forcing the release latch to deflect outwardly thereby releasing the first locking means. First locking means may for example be abutment surfaces on the release latch abutting corresponding abutment surfaces on the body.

According to a further aspect of the training device according to the invention, the training device further comprises a reset base. The reset base comprises a release ramp for disengaging the second locking members when the reset base and the training device are assembled and preferably pushed against each other. By this, the release ramp may exert a certain force onto the locking members of body or shield, enabling to disengage second locking members. By disengaging second locking members, the shield is enabled to be moved to the retracted position and thus the training device to be reset. Preferably, a disengagement of the second locking members is performed by inserting the training device into a reset base having a corresponding volume and by further pushing the training device or parts thereof into the reset base, for example by pushing training device and reset base against each other. Preferably, such a pushing action is done manually. However, it may also be done electronically, by an electronic reset device provided with appropriate holding means for holding the training device and the reset base and actuation means for pushing the two parts against each other.

According to an aspect of the training device comprising a reset base, the training device further comprises a reset cap. The reset cap comprises pushing elements for pushing the body of the training device into the direction of the distal end of the reset base and into the shield. Pushing elements provided in a reset cap may facilitate a resetting of the training device. By pushing reset base and reset cap against each other, the second locking members of the training device are made to pass the release ramp of the reset base. Thereby, the second locking members are released and body and shield may be moved relative to and against each other to a retracted position of the shield. Such a relative movement of shield and body against each other may be performed until the first locking means engage each other and the shield is locked in the retracted position again, the pin extending from the shield due to the biasing force of the pin biasing member. Preferably, reset cap and reset base may have an ergonomic shape making a handling of the reset device more convenient and thereby further facilitating the resetting of the training device.

Preferably, pushing elements extend from the inner wall of the reset cap. Preferably, pushing elements only act onto the body of the training device when a reset cap is assembled with the training device. Pushing elements may be formed as protrusions extending from an inner side wall of the reset cap. Protrusions on inner side wall may for example be guided longitudinally and sideways passing a plunger when being moved into the direction of and into the reset base. However, pushing elements may also be arranged to extend from an inner proximal end of the reset cap, for example in the form of one or several pins or a hollow tube. Pushing elements extending from an inner proximal end are arranged such as to pass through a plunger head and preferably next and along a plunger rod. Accordingly, a plunger head is provided with one or several openings corresponding to the pushing element that is to pass through the plunger head. Preferably, pushing elements extending from an inner proximal end of the reset cap are provided when the body of a training device has a cross-sectional size or shape essentially corresponding to an extension of the plunger head. Since pushing elements are provided for pushing onto the body of the training device, a narrow shape of a body may in this way provide enough contact surface for the pushing elements to act onto the body.

According to another aspect of the training device according to the invention, the plunger comprises a plunger head arranged at a proximal end of the plunger and a radial extension of the plunger head is at least equal to an extension of the open proximal end of the reset base. By this, the plunger head abuts an edge forming the open proximal end of the reset base when pushing the body of the training device into the direction of the distal end of the reset base. This enables the plunger to be retracted from the cavity at the same time and preferably to a same or similar extent as the body is inserted into the shield. Thus, upon movement of reset cap and reset base against each other, preferably in one linear movement, not only the shield may be reset to its initial retracted position but also the plunger is reset to its initial extended position for reuse of the training device. Preferably, an extension of the plunger head, for example a diameter, is equal to an extension of the proximal edge forming the proximal end of the reset base. If a plunger head extends radially outwardly from the proximal end of the reset base, the plunger head is preferably still smaller than an inner extension of the reset cap such that the reset cap may be put over the training device. Preferably, reset base and reset cap have an essentially elliptical cross section or a non-uniform cross section. A radial extension of a plunger head then preferably abuts the proximal edge at the smallest extension of the ellipse or of the non-uniform cross section.

According to another aspect of the invention, there is provided a reset device for a training device for medicine injection devices as described above. The reset device comprises a reset base and a reset cap. The reset base comprises a hollow body having an open proximal end for receiving a distal portion of the training device, and a release ramp arranged on an inner side wall of the hollow body of the reset base for disengaging locking members of the training device. Thereby a shield of the training device is allowed to be moved to a retracted position. The reset cap comprises a hollow body having an open distal end for receiving a proximal portion of the training device, and a push member arranged inside the reset cap for enabling a pushing of a body of the training device further into the reset base upon assembly of the reset device and the training device.

The advantages of the reset device have been described above with respect to the aspects of the training device and will therefore not be repeated.

According to an aspect of the reset device according to the invention, the reset base further comprises an alignment element arranged at the distal end of the reset base for aligning a pin protector in the reset base. A pin protector may be inserted into the reset base and held in position in the reset base by the alignment element. If a training device to be reset is inserted into the reset base provided with the pin protector, the pin protector is attached to the pin in a same process step as resetting the training device. The provision of a pin protector may further adapt the training device for simulation of a one-way ready-to-use injection device, which is generally provided with a needle protector.

According to another aspect of the reset device according to the invention, the push member of the reset cap comprises a protrusion extending from an inner side wall of the reset cap or comprises a longitudinal pin extending from the inner proximal end wall of the reset cap. The push member is provided for pushing onto the body of the training device when reset cap is assembled with reset base provided with the training device.

According to another aspect of the invention, there is provided a method for resetting the training device according to the invention. The method comprises the steps of inserting the training device in a used state into a hollow body of a reset base, putting a reset cap over a proximal portion of the training device, and pushing the reset base and the reset cap against and preferably over each other. Thereby, a body of the training device is pushed into the direction of the distal end of the reset base thus disengaging second locking members of the training device and allowing a shield of the training device to advance to a retracted position where the shield is locked in the retracted position.

According to an aspect of the method according to the invention, the method further comprises the step of abutting a plunger head attached to a proximal end of a plunger of the training device to a proximal end of the reset base, thereby retracting the plunger from the body while pushing the body into the direction of the distal end of the reset base. By also retracting the plunger out of the body during the reset method, that is while pushing reset cap and reset base against each other, the training device may completely be reset and be put in condition for reuse without further handling required.

According to another aspect of the method according to the invention, the step of pushing the body of the training device into the direction of the distal end of the reset base is performed by providing a push member arranged inside the reset cap. In addition, the step of disengaging second locking members of the training device is performed by pressing a release ramp arranged on an inner side wall of the reset base against the second locking members of the training device.

In some embodiments of the method according to the invention, for performing the pushing of the body, the push member may sideways pass a plunger head of the training device before pushing onto the body. Push member may also pass through the plunger head to reach a body, which is arranged distally to the plunger head.

According to another aspect of the method according to the invention, the method further comprises the step of inserting a pin protector into the reset base before inserting the training device, preferably in a used state, into the reset base.

The advantages of the aspects of the method for resetting the training device have been described above with respect to the aspects of the training device and with respect to the reset device and will therefore not be repeated.

The training device according to the invention is used for simulating an injection of a medicine into a patient. Preferably, the injection of a medicine into a person is simulated. More preferably, the injection of a medicine for treating arthritis, rheumatism, or gout is simulated.

The training device may be provided with an extended finger flange portion. The training device may thereby simulate a real injection device that is provided with an extended finger flange—as integral part of the injection device or as a separate part attached to the injection device facilitating use of the real injection device. An extended finger flange is a portion laterally, preferably radially, extending from the training device. Most injection devices are provided with a finger part. By the finger part, an injection device is held when administering the medicine, that is, when operating the plunger. The extended finger flange according to the invention preferably is a part of the shield which enables a good hold of the training device when pushing the plunger into the body. Preferably, an extended finger flange is an enlarged finger part, preferably having an ergonomic shape for receiving one or several fingers. An enlarged finger flange may be formed integrally with the shield or may be a separate part. An extended finger flange as separate part is preferably clipped, clamped or otherwise temporarily and removably attached to the training device. A removable finger flange may be removed after use of the training device and for example stored in a reset device. Preferably, the reset device, for example a reset base, provides enough space to store the extended finger flange in the base when the training device is not in use. Preferably, a removable finger flange is adapted to also be attached to a real injection device. By this, the operation of an injection device may be facilitated and a same extended finger flange may be used for the training device and for the real injection device.

The training device or reset device according to the invention may be provided as parts of a training system comprising a training device according to the invention and comprising a reset device according to the invention.

BRIEF DESCRIPTION OF THE DRAWINGS

In the following, embodiments of the training device according to the invention and of the reset device according to the invention are shown by means of the enclosed drawings, wherein:

FIG. 1 shows an exploded view of an embodiment of the training device;

FIG. 2 shows an exploded view of another embodiment of the training device;

FIGS. 4-8 are perspective views of a sequence showing operation of the training device of FIG. 1 from a ready-to-use to a used position;

FIGS. 15-19 are perspective views of a sequence showing operation of the training device of FIG. 2 from a ready-to-use to a used position;

FIGS. 20-25 are perspective views of a sequence showing the reset operation of the training device of FIG. 2 including a corresponding reset device;

DETAILED DESCRIPTION

Figure 26:
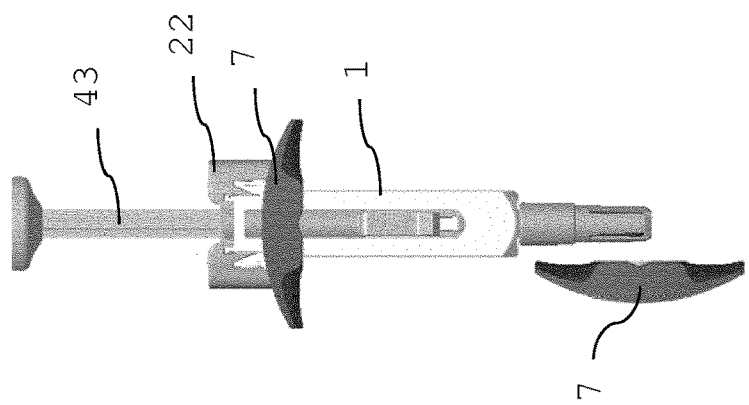
FIG. 26 shows a training device including extended finger flange.

In FIG. 1 a first embodiment of the training device is shown in an exploded view. The training device comprises an outer shield 1 to receive a spring 3, a pin protector 49 consisting of an outer pin protection cap 490 and an inner pin protection cap 491, a pin housing 25 for receiving a pin and a soft spring 47, and to receive a body 2 for receiving a plunger 43.

Shield 1 has an essentially square hollow body member 10 which is provided on each side (front and rear) with a longitudinally extending slot 11 for accommodating and guiding a respective projection 241 of a flexible leg 24 provided at the distal end of body 2. Body 2 comprises an essentially square hollow body member 20. The flexible legs 24 are arranged on two sides (front and rear) of the body 2. The loose ends of legs 24 are provided with outwardly directing projections 241.

In addition, shield 1 is provided with a snap slot 12 provided on each side (front and rear) in body member 10 proximal to longitudinally extending slot 11 for accommodating the projection 241 of flexible leg 24 and locking shield 1 with body 2 with shield 1 being in an extended position.

At its proximal end, shield 1 is provided with two flexible tongues 13 for engaging body 2 and retaining shield in a retracted position. In the retracted position the proximal free ends of tongues 13 extend through two flanges 22 provided at the provided at the proximal end of body member 20 of body 2. Flexible tongues 13 comprise protrusions 130. Lower edges of protrusions 130 of flexible tongues 13 are for resting on respective upper edges (not shown) arranged in the two flanges 22 of body member 20 when shield 1 is in the retracted position. This snap-fit connection may be released by pressing flexible tongues 13 radially outwardly.

Helical spring 3 is arranged between body 2 and shield 3. In the retracted position, where body 2 is retained within shield 1, spring 3 is compressed. In the extended position of shield 1 spring 3 is released and body 2 has been pushed in the proximal direction.

Shield 1 also comprises an open distal end for the pin 48 to extend though said open distal end when the shield is in the retracted position.

Pin housing 25 is provided with a projection 210 slidable and guided in the longitudinally extending slot 11 of shield 1, providing a stop while cooperating with the proximal end of the longitudinally extending slot when shield 1 is in the retracted position. Pin housing 25 further comprises locking means 250 for a (non-releasable) snap-fit connection with body 2. Soft spring 47 is arranged in pin housing 25 between enlarged proximal end 480 of pin 48 and closed bottom 23 of body 2 at the distal end of body 2.

Plunger 43 comprises two plate springs 44, which may be made from one single piece of material, arranged at the distal end of the plunger on two opposite (lateral) sides of the plunger. Plate springs 44 extend from the distal end of the plunger along a portion of the plunger and extend radially therefrom. Plate springs 44 are resiliently compressible in the direction of the plunger rod 431 thereby exerting a certain force that may be adapted through selection and form of the plate springs 44. The force needed for compressing and moving plate springs along the cavity in body member 20 when plunger and body 2 are assembled, represents and simulates an injection resistance of a real injection device caused by administration of a medicament.

In FIG. 2 another embodiment of the training device is shown in an exploded view. For the same or similar elements the same reference signs have been used. Reference is made to features different to the first embodiment of FIG. 1.

Body member 10 of shield 1 essentially has a circular hollow body. The locking members of the shield for locking shield 1 in the retracted position are formed as two short cantilevers 14 arranged in two flanges 15 at the proximal end of shield 1 and on two lateral sides of shield 1. Cantilevers 14 have protrusions 141 at their distal ends and are flexibly bendable radially outwardly. Lower edges of protrusions 141 of cantilever 14 are adapted for resting on respective upper edges 270 of protrusions 27 arranged at the circumference of body member 20 of body 2.

Projection 210 of the pin housing 25, which projection 210 is slidable and guided in the longitudinally extending slot 11 of shield 1 and which is providing a stop while cooperating with the proximal end of the longitudinally extending slot 11 when shield 1 is in the retracted position, is formed as a flap directing outwardly from and to the proximal end of the pin housing 25.

Body 2 may completely be inserted into shield 1. Therefore, proximal end of body 2 essentially has a circular shape of a diameter small enough for body 2 to be completely immersed into the flanges 15 of shield 1. Plunger 43 comprises a plunger head 430 having an open structure for push elements of a reset device to pass through the plunger head and be guided next to the plunger rod 431, which will be described in detail below.

Figure 3:
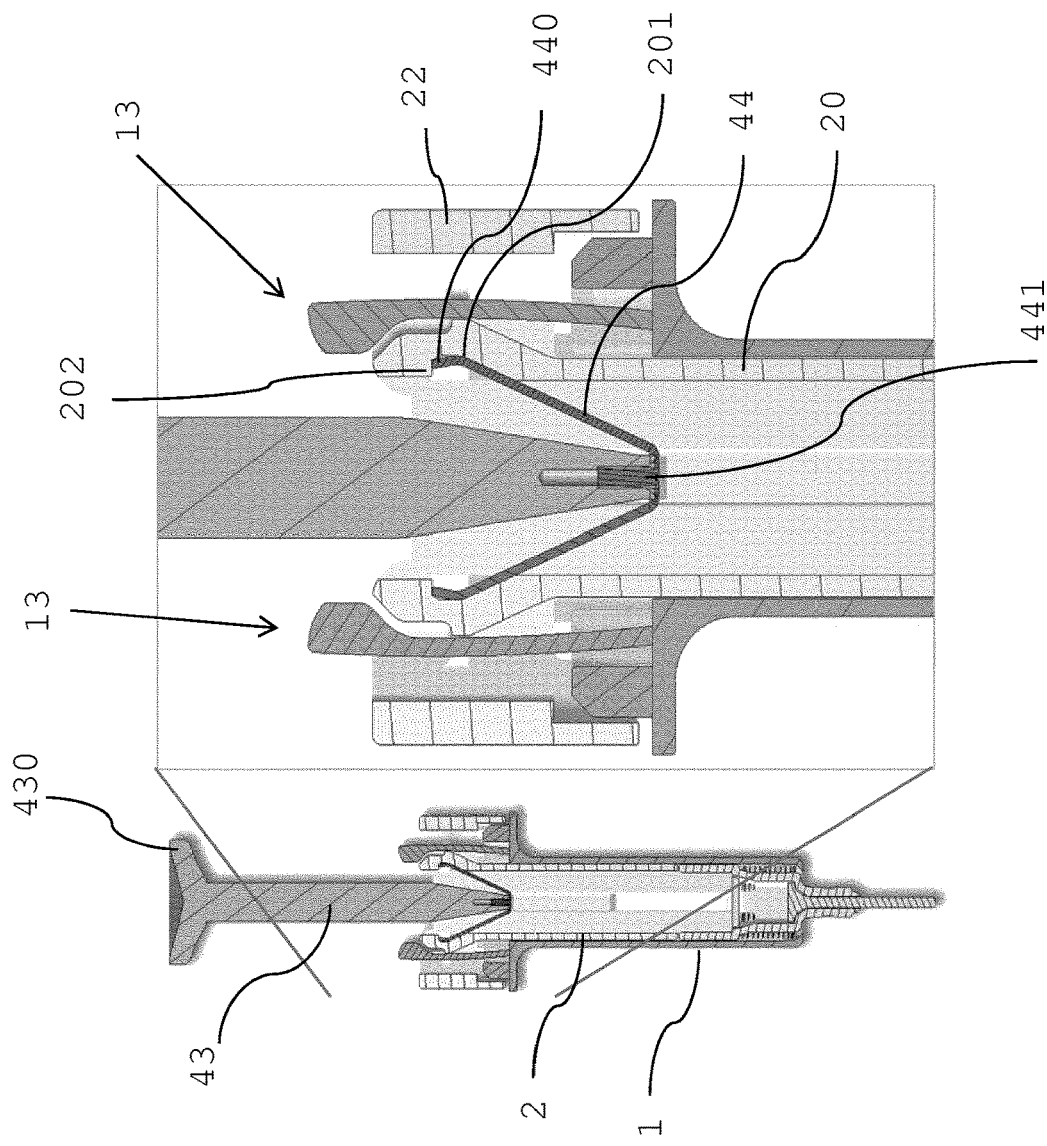
FIG. 3 is a cross-sectional view of a training device and an enlarged section of the proximal end of shield and body in a retracted position of the shield, with the training device in a ready-to-use position.

In FIG. 3 the simulation of an injection resistance is further described and shown with respect to the embodiment according to FIG. 1. However, the simulation of the injection resistance may be realized in the same or similar manner independently of the realization of the other features of the training device. The left hand side of FIG. 3 schematically shows the training device in an assembled state, ready for use. Plunger 43 is inserted into the cavity formed inside the body member 20 of body 2. Plate springs 44, preferably formed from one single piece of a metal sheet, radially extend from the plunger and direct to the proximal end of plunger 43. The plate springs are attached to the distal end of plunger 43. Preferably, the plate spring is clipped and permanently attached to the plunger by means of a permanently deformed pin 441. This may for example be achieved by ultrasonic welding, for example using a pin and preferably also a plunger or distal plunger end made of or containing a thermoplastic material. However, it is also possible to provide a pin of a thermoplastic material and the material of plunger having an open structure such that the molten material of the pin may penetrate the material of the plunger such as to provide a form lock. Also, the attachment of the plate springs may be achieved by other means, for example by a screw, rivet or mechanical clip or any other method suitable for attaching the plate spring, for example a press fit.

In an extended position of plunger 43, as shown in FIG. 3, proximal ends 440 of plate springs 44 lie in a recess 201 formed on the inner wall of and at the proximal end of body member 20. Proximal ends 440 of plate springs 44 provide end stops for abutting to a mechanical stop 202 provided at the proximal end of the recess 201. Thereby, it is prevented that plunger 43 is inadvertently removed from body member 20 when plunger 34 is pulled to an extended position (for example as part of the reset action). In addition, the starting position for an injection simulation is defined and reproducible. By now pressing the plunger 43 via plunger head 430 into the direction of the distal end of the training device, plate springs 44 are compressed and its resistance against inner side wall of body member 20 simulates an injection resistance.

In FIGS. 4 to 8 the operation of the training device according to FIG. 1 simulating the use of a real injection device is shown. In FIG. 4 the training device represents a disposable ready-to-use injection device with a pin protector 49 attached to the training device. Shield 1 and body 2 are locked against each other in the extended position of shield 1. Protrusions 130 on flexible legs 13 engage corresponding edges inside the flanges 22 of body 2.

Pin protector 49 is removed (FIG. 5) and training device is set onto the skin of a user. Upon pressure on tip of pin 48 spring 47 is compressed (see also FIG. 1) and pin 48 is partly moved into the pin housing 25 (not shown in FIG. 6).

Plunger 43 is moved inside body member 20 by pressing the plunger head 430 in the direction towards the distal end of the training device or shield 1, respectively. When plunger head 430 reaches the outer ends of tongues 13, this corresponds to the end of the simulation of administering a proper amount of medicine. Tongues 13 are then bent outwardly due to the larger diameter of plunger head 430 and thus shield 1 is released from the retracted position in which it is retained. Spring 3 then decompresses and moves body 2 and pin 48 in the proximal direction (FIG. 7; body 2 is not completely pushed back or shield 1 is not completely extended, respectively). The guided movement of body 2 relative to shield 1 continues until projection 241 reaches snap slot 12 and engages into snap slot 12 so as to form a snap-fit (FIG. 8). The pin is now completely arranged within shield 1 simulating the protection of a needle in the extended position of shield 1. The training device is now in a used state, representing a real injection device in a condition for being disposed of. However, the training device may be reset to a condition of reuse, which resetting mechanism is shown in FIGS. 9 to 14.

Figures 9, 10, 11, 12, 13, 14:
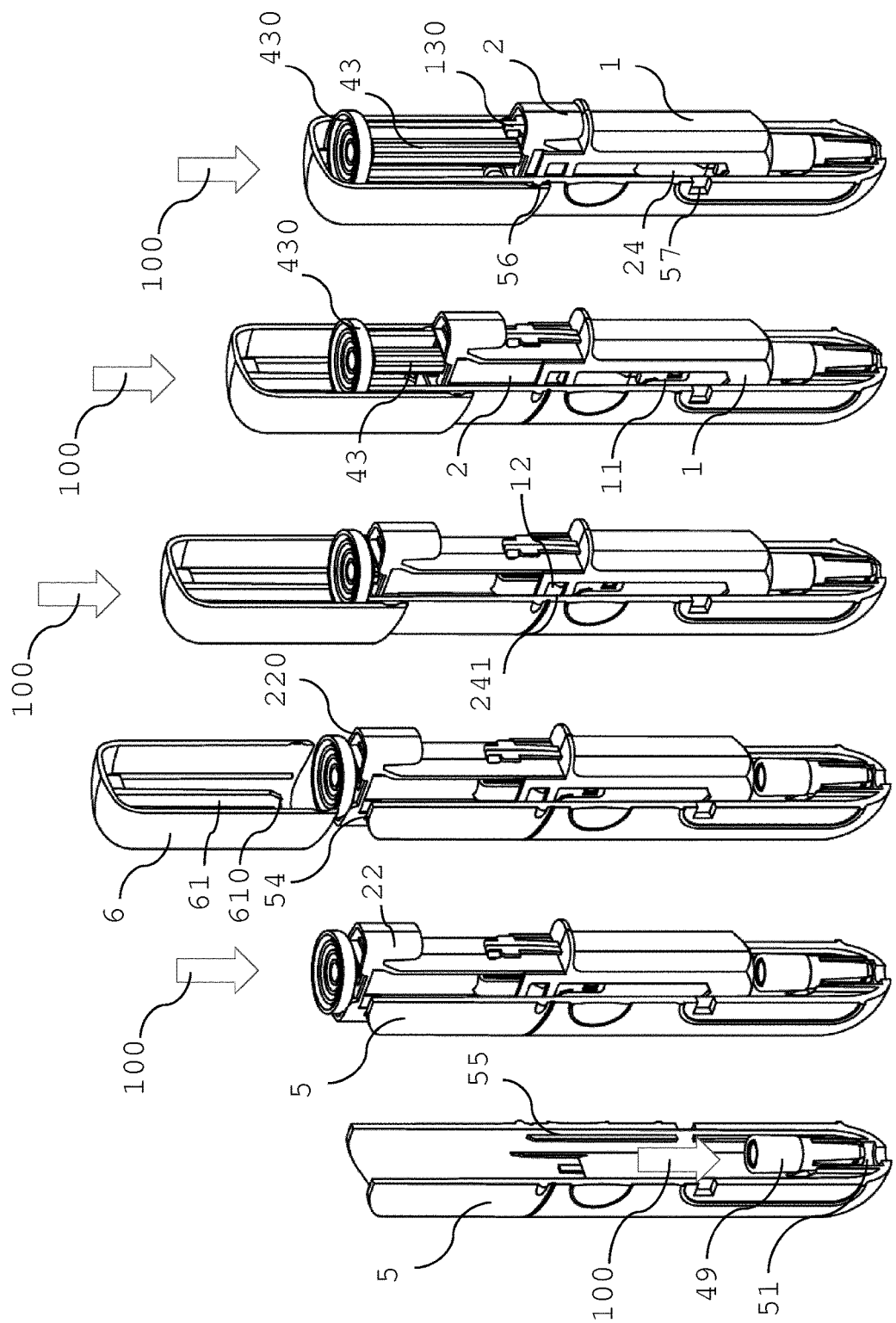
FIGS. 9-14 are perspective views of a sequence showing the reset operation of the training device of FIG. 1 including a corresponding reset device.

For enabling the training device to be reset, the locking mechanism, locking shield 1 in the extended position covering the pin 48 must be released (FIG. 8). In addition, plunger 43 has to be out of body 2 to its extended position (FIG. 4 and FIG. 14). In FIGS. 9 to 14 a moving direction of the training device, the reset device or parts of these devices is indicated by open arrow 100.

For resetting the used training device pin protector 49 is inserted into elliptically shaped reset base 5. The end of pin protector 49 for receiving pin 48 (not shown) directs to the proximal end of the reset device (FIG. 9). Pin protector 49 is aligned and held in a circularly shaped protrusion 51 extending from the inner bottom wall of reset base 5. The used training device is inserted into reset base 5 (FIG. 10). Elliptically shaped reset cap 6 is put over training device in reset base 5 (FIG. 11 and FIG. 12) and pushed into the direction of the distal end of reset base 5. Reset cap 6 comprises longitudinally extending ribs 61 provided on two opposite sides of reset cap 6 (one side shown only). Distal ends 610 of longitudinal ribs 61 abut against proximal rim 220 of flanges 22 of body 2. Thereby, training device is further pushed into reset base 5 until the plunger head 430 abuts proximal rim 54 of reset base 5. Then body 2 but not plunger 43 is further pushed into shield 1 against the force of helical spring 3 (see FIG. 1). Thereby, the projections 241 of legs 24 are pressed inwardly when body 2 passes release ramp 55 arranged on inner side wall of base 5. The release ramp 55 presses onto projections 241, which are then enabled to pass snap slot 12 and release the lock between shield 1 and body 2. Shield 1 and body 2 are brought into the retracted position of the shield again. By the same movement the plunger 43 is drawn out of body 2, such that the training device is ready for use again. Plunger 43 is guided by ribs 61 of reset cap 6. Reset base 5 is provided with opening 57 for projection 241 to extend into when the training device in the reset device is ready for use again. Reset base 5 and reset cap 6 essentially are hollow tubes with closed distal or proximal end, respectively. They also form a storage device for the reset or ready-to-use training device. Thereby, it may be favorable to keep legs 24 of body 2 in a decompressed state. Reset base 5 and reset cap 6 are provided with cooperating snap means 56 to form a releasable snap-fit between the base and reset cap 6 to hold them in the assembled state.

In FIGS. 15 to 19 the operation of the training device according to FIG. 2 is shown. Again, protector pin 49 is removed from the training device and plunger head 430 is pushed into body 2. In the extended position, plunger head 430 is completely inserted into flanges 15 of shield 1 and presses onto projections 141 on cantilevers 14 (FIG. 17). These are pushed radially outwardly releasing the lock between shield 1 and body 2. The force of spring 3 makes body 2 and shield 1 to be moved relative to each other into an extended position of shield 1 while projection 241 is being guided in longitudinal slot 11 (FIG. 18). This movement is performed until projection 241 snaps into snap slot 12 and locks shield and body 2 in the extended position of shield 1.

FIGS. 20 to 25 show the resetting mechanism of the training device according to FIG. 2 and FIG. 19. In this embodiment reset base 5 is provided with a circumferentially running reset ramp 58, projecting from the inner side wall of reset base 5 (FIG. 20). Plunger head 430 is provided with four through-holes 4301 (FIG. 21). The through-holes are arranged around the center of the plunger head 430 such that four pins 62 extending from the proximal inner end wall of reset cap 6 may extend through the through-holes and be guided next to the plunger-rod 431 (FIG. 22-24). When the training device is pushed into reset base 5 plunger head 430 abuts to proximal rim 54 of reset base 5. Again, body 2 but not plunger 43 is further pushed into shield 1 by the pushing action of the pins 62 against the force of helical spring 3. Thereby, the projections 241 of legs 24 are pressed inwardly when body 2 passes release ramp 58. The lock between shield 1 and body 2 is released and shield 1 and body 2 are brought into the retracted position of shield 1 again interlocking cantilever projection 141 and upper edges 227 of protrusions 27 of body (FIG. 25). By the same movement the plunger 43 is drawn out of body 2 and guided by pins 62 of reset cap 6.

In FIG. 26 a training device with an extended finger flange 7 is shown. Extended finger flange 7 is provided as a separate part (shown in the bottom left of FIG. 26) removably attachable to the training device. Extended finger flange 7 has the form of a section of a disc-like element. When extended finger flange 7 is attached to the training device, i.e. to shield 1, extended finger flange 7 extends sideways from the training device. It extends in two opposite lateral directions. By the application of extended finger flange 7, flanges 22 of shield 1, which serve for gripping the device when pushing plunger 43 into the body of the device may be extended. Thereby a gripping and thus an operation of the training device is facilitated. In addition, if a real injection device is provided with an extended finger flange, the simulation of such a real device may be performed in a more realistic manner.

The invention claimed is:

1. A training device for medicine injection devices, the training device comprising:
   a body having a proximal end and a distal end and a cavity formed in the body;
   a shield having a proximal end and a distal end, the shield being slidably attached to the body, slidable between a retracted position exposing a pin arranged at the distal end of the body and directing from the distal end of the body, and an extended position covering the pin;
   a spring coupled to the body and the shield, the spring biasing the shield to enable the shield to advance toward the extended position;
   releasable cooperating first locking members on the body and the shield for engaging the body with the shield to hold the shield in the retracted position;
   releasable cooperating second locking members on the body and the shield for engaging the body with the shield to hold the shield in the extended position; and
   a reset base configured to receive a distal end of the training device, the reset base having a release ramp for disengaging the releasable cooperating second locking members when the reset base and the training device are assembled,
   wherein the training device further includes a plunger slidably arranged in the cavity of the body and having a compressible element adapted to exert a force when the plunger is moved in the cavity towards the distal end of the body, the force corresponding to an injection resistance of a medicine injected into a patient.

2. The training device according to claim 1, wherein:
   the compressible element comprises plate springs mounted to the distal end of the plunger; and
   the plate springs extend along a portion of the plunger and radially outwardly from the plunger.

3. The training device according to claim 1, wherein the pin is slidably arranged in a pin mounting element that comprises a pin biasing member adapted to be tensioned when the pin is moved in a proximal direction.

4. The training device according to claim 1, wherein the releasable cooperating first locking members comprise a release latch arranged at the proximal end of the shield, the release latch being deflectable outwardly for disengaging the releasable cooperating first locking members and thereby allowing the shield to advance to the extended position.

5. The training device according to claim 1, wherein the pin has a rounded distal tip.

6. The training device according to claim 1, wherein the body is provided with an abutment portion at its proximal end, the abutment portion being adapted to cooperate with an end stop provided at the plunger to prevent the plunger from being entirely removed from the cavity when the plunger is moved in a proximal direction.

7. The training device according to claim 6, wherein the abutment portion is a recess in an inner wall of the body and the end stop is a proximal end of the compressible element.

8. The training device according to claim 1, further comprising a reset cap having pushing elements for pushing the body of the training device into the direction of the distal end of the reset base and into the shield.

9. The training device according to claim 8, wherein the plunger comprises a plunger head arranged at a proximal end of the plunger and wherein a radial extension of the plunger head is at least equal to an extension of the open proximal end of the reset base such that the plunger head abuts an edge forming the open proximal end of the reset base when pushing the body of the training device into the direction of the distal end of the reset base.

10. A reset device for a training device for medicine injection devices according to claim 1, the reset device comprising the reset base and a reset cap, the reset base comprising:
    a hollow body having an open proximal end for receiving the distal end of the training device; and
    the release ramp arranged on an inner side wall of the hollow body of the reset base for disengaging the releasable cooperating second locking members of the training device thereby allowing the shield of the training device to be moved to the retracted position, and
    the reset cap comprising:
    a hollow body having an open distal end for receiving a proximal portion of the training device; and
    wherein a push member is arranged inside the reset cap for enabling a pushing of the body of the training device farther into the reset base upon assembly of the reset device and the training device.

11. The reset device according to claim 10, wherein the reset base further comprises an alignment element arranged at the distal end of the reset base for aligning a pin protector in the reset base.

12. The reset device according to claim 10, wherein the push member of the reset cap comprises a protrusion extending from an inner side wall of the reset cap or a longitudinal pin extending from the inner proximal end wall of the reset cap.

13. A method for resetting the training device according to claim 1, comprising:
    inserting the training device in a used state into a hollow body of a reset base;
    putting a reset cap over a proximal portion of the training device; and
    pushing the reset base and the reset cap against each other, thereby pushing a body of the training device into the direction of the distal end of the reset base, thus disengaging releasable cooperating second locking members of the training device allowing a shield of the training device to advance to a retracted position and locking the shield in the retracted position.

14. The method according to claim 13, further comprising the step of abutting a plunger head attached to a proximal end of a plunger of the training device to a proximal end of the reset base, thereby retracting the plunger from the body while pushing the body into the direction of the distal end of the reset base.

15. The method according to claim 13, wherein:
the step of pushing the body of the training device into the direction of the distal end of the reset base is performed by providing a push member arranged inside the reset cap; and
the step of disengaging releasable cooperating second locking members of the training device is performed by pressing a release ramp arranged on an inner side wall of the reset base against the releasable cooperating second locking members of the training device.

16. The method according to claim 13, further comprising the step of inserting a pin protector into the reset base before inserting the training device into the reset base.

\* \* \* \* \*